US012634764B2

(12) United States Patent
Suh et al.

(10) Patent No.: US 12,634,764 B2
(45) Date of Patent: May 19, 2026

---

(54) METHOD AND DEVICE FOR EXEMPTION FROM NETWORK SLICE BITRATE LIMITATIONS IN WIRELESS COMMUNICATION SYSTEM

(71) Applicant: Samsung Electronics Co., Ltd., Suwon-si (KR)

(72) Inventors: Dongeun Suh, Suwon-si (KR); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 17/973,052

(22) Filed: Oct. 25, 2022

(65) Prior Publication Data

US 2023/0132640 A1 May 4, 2023

(30) Foreign Application Priority Data

Oct. 29, 2021 (KR) ........................ 10-2021-0147315
Mar. 28, 2022 (KR) ........................ 10-2022-0038155

(51) Int. Cl.
*H04W 28/22* (2009.01)

(52) U.S. Cl.
CPC .................................. *H04W 28/22* (2013.01)

(58) Field of Classification Search
CPC .. H04W 28/0268; H04W 28/22; H04L 12/14; H04L 12/1407; H04L 65/80; H04M 15/58; H04M 15/61; H04M 15/805; H04M 15/66; H04M 15/8016; H04M 15/8033
See application file for complete search history.

(56) References Cited

U.S. PATENT DOCUMENTS

| | | | | |
|---|---|---|---|---|
| 2017/0078209 A1* | 3/2017 | Miklós | .............. | H04W 28/0289 |
| 2017/0201902 A1* | 7/2017 | Chen | ................. | H04W 28/0268 |
| 2017/0332282 A1* | 11/2017 | Dao | ....................... | H04L 1/0002 |
| 2024/0196263 A1* | 6/2024 | Hedman | .............. | H04M 15/66 |

FOREIGN PATENT DOCUMENTS

| | | |
|---|---|---|
| EP | 3 800 917 A1 | 4/2021 |
| KR | 10-2021-0025455 A | 3/2021 |

OTHER PUBLICATIONS

Ericsson et al., Notification of SM Policy Association Establishment, 3GPP TSG RAN SA2 Meeting #146-e, pp. 15, 28, S2-2106969, Aug. 28, 2021.
Huawei et al., UP resources establishment for NR RedCap UE, 3GPP TSG RAN SA2Meeting #147-e,pp. 1-27, S2-2107626, Oct. 11, 2021.

(Continued)

*Primary Examiner* — Dady Chery
(74) *Attorney, Agent, or Firm* — Jefferson IP Law, LLP

(57) ABSTRACT

A method and device for providing an exemption from a network slice bitrate limitation are provided. A method performed by an access and mobility management function (AMF) in a wireless communication system supporting bitrate limitation for a network slice is provided. The method includes receiving, via a radio access network (RAN) from a user equipment (UE), information a first message including cause information associated with allowable maximum bitrate (MBR) for the UE, and determining, based on the cause information, whether to transmit information related to an exemption of the bitrate limitation to the RAN.

18 Claims, 8 Drawing Sheets

(56)     References Cited

OTHER PUBLICATIONS

Ericsson, 'Analysis of Solutions for S-MBR support', 3GPP TSG RAN3 #114-e,pp. 1-52, R3-215225, Oct. 21, 2021.

International Search report dated Jan. 26, 2023, issued in International Patent Application No. PCT/KR2022/016377.

Extended European Search Report dated Jan. 27, 2025, issued in European Application No. 22887570.4-1215.

3GPP TSG-SA2 Meeting #147E; S2-2107952; Selection of the PCF for network slice related policy control; XP52062846 A, Oct. 25, 2021.

3GPP TSG-CT3 Meeting #118e; C3-215155; Support of Slice_MBR; XP 52055405 A, Sep. 30, 2021.

3GPP TS 23.503; Technical Specification Group Services and System Aspects; XP52056733 A, Sep. 24, 2021.

\* cited by examiner

METHOD AND DEVICE FOR EXEMPTION FROM NETWORK SLICE BITRATE LIMITATIONS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0147315, filed on Oct. 29, 2021, in the Korean Intellectual Property Office, and of a Korean patent application number 10-2022-0038155, filed on Mar. 28, 2022, in the Korean Intellectual Property Office, the disclosure of each of which is incorporated by reference herein in its entirety.

BACKGROUND

1. Field

The disclosure relates to a method and device for providing an exemption from a network slice bitrate limitation in a wireless communication system.

2. Description of Related Art $5^{th}$ Generation (5G) mobile communication technology defines a wide frequency band to enable fast transmission speed and new services and may be implemented in frequencies below 6 GHz ('sub 6 GHz'), such as 3.5 GHz, as well as in ultra-high frequency bands ('above 6 GHz'), such as 28 GHz and 39 GHz called millimeter wave (mmWave). Further, $6^{th}$ Generation (6G) mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by $\frac{1}{10}$.

In the early stage of 5G mobile communication technology, standardization was conducted on beamforming and massive multiple input multiple output (MIMO) for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 pre-processing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, NR UE power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step RACH for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metabus services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

5GC supports the following differentiated functions as compared to the evolved packet core (EPC), which is the legacy network core for 4G.

First, 5GC adopts the network slicing function. As a requirement of 5G, 5GC should support various types of terminals and services, e.g., enhanced mobile broadband (eMBB), ultra-reliable low latency communications (URLLC), or massive machine type communications (mMTC). These UEs/services have different requirements for the core network. For example, the eMBB service requires a high data rate while the URLLC service requires high stability and low latency. Network slicing is technology proposed to meet such various requirements.

Network slicing is a method for creating multiple logical networks by virtualizing one physical network, and the network slice instances (NSIs) may have different characteristics. Therefore, various service requirements may be met by allowing each NSI to have a network function (NF) suited for its characteristics. Various 5G services may be efficiently supported by allocating an NSI meeting required service characteristics for each UE.

Second, 5GC may seamlessly support the network virtualization paradigm by separating the mobility management function and the session management function. In legacy 4G LTE, all UEs may receive services over the network through signaling exchange with a single core device called the mobility management entity (MME) in charge of registration, authentication, mobility management and session management functions. However, in 5G, the number of UEs may explosively increase and mobility and traffic/session characteristics that need to be supported according to the type of UE are subdivided. Resultantly, if all functions are supported by a single device, such as MME, the scalability of adding entities for each required function may decrease. Accordingly, various functions are under development based on a structure that separates the mobility management function and the session management function to enhance the scalability in terms of function/implementation complexity of the core equipment in charge of the control plane and the signaling load.

The above information is presented as background information only to assist with an understanding of the disclosure. No determination has been made, and no assertion is made, as to whether any of the above might be applicable as prior art with regard to the disclosure.

SUMMARY

When the bandwidth (i.e., bitrate) value used in the network slice becomes substantially the same as or larger than a value predefined for a specific network slice, it operates in such a manner as to reject a new flow or limit existing traffic.

Aspects of the disclosure are to address at least the above-mentioned problems and/or disadvantages and to provide at least the advantages described below. Accordingly, an aspect of the disclosure is to provide a method and device for services or contexts in which issues may arise when they are limited by the bitrate limiting function on the network slice.

Another aspect of the disclosure is to provide a method and device that does not reject flows (i.e., sessions), established through a radio access network (RAN) not providing the bitrate limiting function per UE network slice, when the flows are handed over to a RAN providing the function, due to the mobility of the UE.

Additional aspects will be set forth in part in the description which follows and, in part, will be apparent from the description, or may be learned by practice of the presented embodiments.

In accordance with an aspect of the disclosure, a method performed by an access and mobility management function (AMF) in a wireless communication system supporting bitrate limitation for a network slice is provided. The method includes receiving, via a radio access network (RAN) from a user equipment (UE), a first message including cause information associated with an allowable maximum bitrate (MBR) for the UE, and determining, based on the cause information, whether to transmit information related to an exemption of the bitrate limitation to the RAN.

In accordance with another aspect of the disclosure, an AMF in a wireless communication system supporting bitrate limitation for a network slice is provided. The AMF includes a transceiver, and a processor coupled with the transceiver and configured to receive, via a radio access network (RAN) from a user equipment (UE), a first message including cause information associated with an allowable maximum bitrate (MBR) for the UE, and determine, based on the cause information, whether to transmit information related to an exemption of the bitrate limitation to the RAN.

In accordance with another aspect of the disclosure, a method performed by an AMF in a wireless communication system supporting bitrate limitation for a network slice is provided. The method includes receiving, via a radio access network (RAN) from a user equipment (UE), a registration request, transmitting, to a unified data management (UDM), a request message for requesting subscription information for the UE, receiving, from the UDM, a response message including the subscription information for the UE, performing a policy association or modification procedure with a policy control function (PCF), and transmitting, to the RAN, allowable maximum bitrate (MBR) exemption information for the UE in case that the AMF obtains information related to an exemption of the bitrate limitation from the UDM or the PCF.

In accordance with another aspect of the disclosure, an AMF in a wireless communication system supporting bitrate limitation for a network slice is provided. The AMF includes a transceiver, and a processor coupled with the transceiver and configured to receive, via a radio access network (RAN) from a user equipment (UE), a registration request, transmit, to a unified data management (UDM), a request message for requesting subscription information for the UE, receive, from the UDM, a response message including the subscription information for the UE, perform a policy association or modification procedure with a policy control function (PCF), and transmit, to the RAN, allowable maximum bitrate (MBR) exemption information for the UE in case that the AMF obtains information related to an exemption of the bitrate limitation from the UDM or the PCF.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
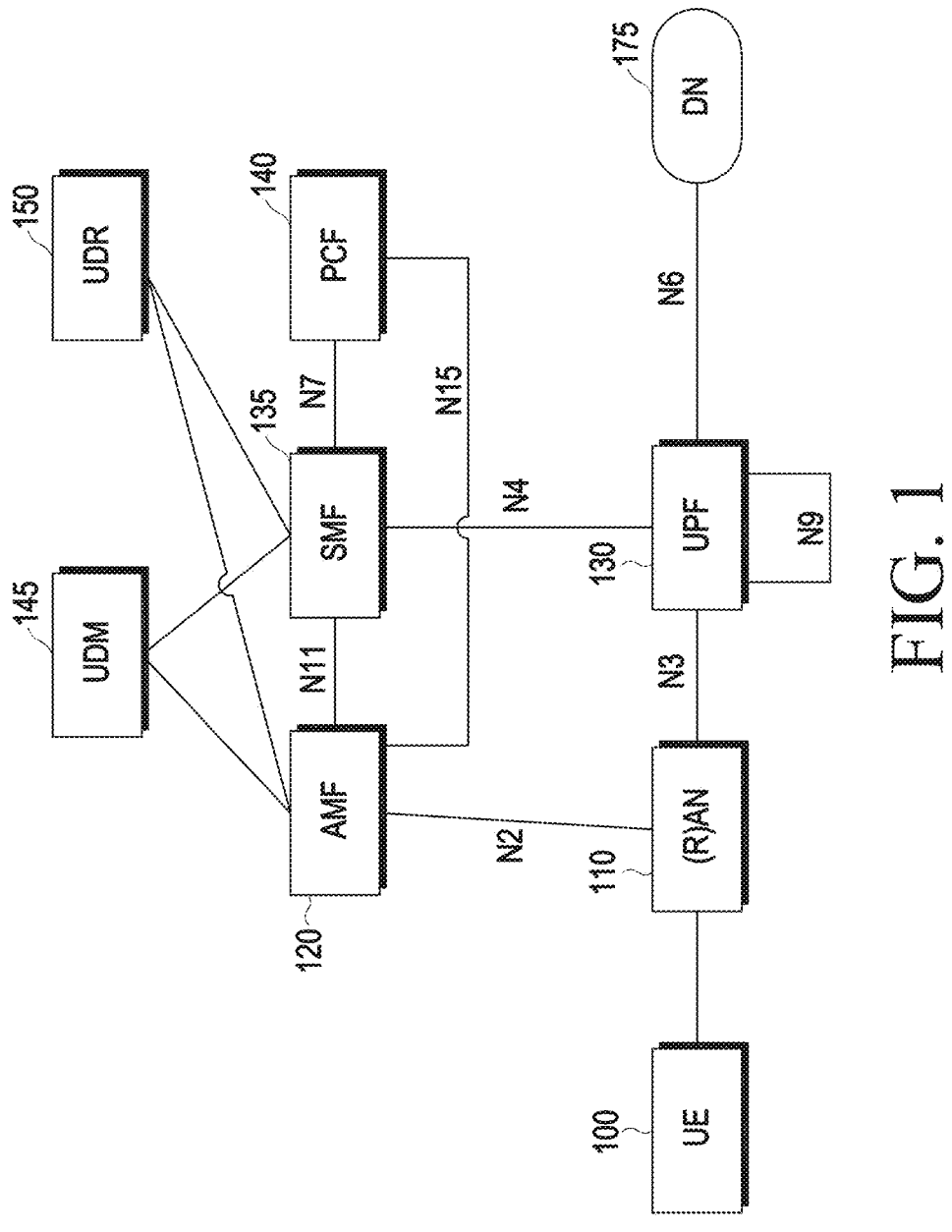
FIG. 1 illustrates a system structure of a 5GS according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments of the disclosure, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflects the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card.

Those skilled in the art will understand that, unless specifically stated otherwise, the singular forms "a", "an" and "the" may include plural forms. It should be further understood that the word "comprise" and "include" used in the specification of the disclosure refers to the presence of the described features, integers, steps, operations, elements and/or components, but does not exclude the presence or addition of one or more other features, integers, steps, operations, elements, components, and/or combinations thereof. It should be understood that when an element is referred to as being "connected" or "coupled" to another element, it can be directly connected or coupled to the other element, or intermediate elements may also be present. Furthermore, "connected" or "coupled" as used herein may include wirelessly connected or wirelessly coupled. As used herein, the term "and/or" includes all or any of the elements and all combinations of one or more of the associated listed items.

According to embodiments of the disclosure, the base station may be an entity allocating resource to terminal and may be at least one of gNode B, gNB, eNode B, eNB, Node B, base station (BS), wireless access unit, base station controller, or node over network. The base station may be a network entity including at least one of an integrated access and backhaul-donor (IAB-donor), which is a gNB providing network access to UE(s) through a network of backhaul and access links in the NR system, and an IAB-node, which is a radio access network (RAN) node supporting NR backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link.

Further, the UE may include a user equipment (UE), a mobile station (MS), a cellular phone, a smart phone, a computer, or various devices capable of performing a communication function. In the disclosure, downlink (DL) refers to a wireless transmission path of signal transmitted from the base station to the terminal, and uplink (UL) refers to a wireless transmission path of signal transmitted from the terminal to the base station. Although the LTE or LTE-A systems may be described below as an example, embodiments of the disclosure may be applied to other communication systems having a similar technical background or channel shape. For example, 5G mobile communication technology (5G, new radio, NR) developed after LTE-A may be included therein, and 5G below may be a concept including legacy LTE, LTE-A and other similar services. Further, the embodiments may be modified in such a range as not to significantly depart from the scope of the disclosure under the determination by one of ordinary skill in the art and such modifications may be applicable to other communication systems.

As used herein, terms denoting signals, terms denoting channels, terms denoting control information, terms denoting network entities, and terms denoting device components are provided as an example for ease of description. As used herein, terms for identifying nodes, terms denoting messages, terms denoting inter-network entity interfaces, and terms denoting various pieces of identification information are provided as an example for ease of description. The disclosure is not limited to the terms, and other terms equivalent in technical concept may also be used.

Further, although the disclosure describes various embodiments using terms used in some communication standards (e.g., 3rd generation partnership project (3GPP)), this is merely an example for description. Various embodiments of the disclosure may be easily modified and applied in other communication systems.

The 3GPP standard standardized the 5G network system architecture and procedures. A mobile communication carrier may provide various services in a 5G network. To provide each service, the mobile communication carrier needs to meet different service requirements (e.g., latency, communication range, data rate, bandwidth, reliability, etc.) for each service.

The mobile communication carrier may constitute the network slice and may allocate network resources suitable for a specific service for each network slice or for each set of network slices.

FIG. 1 illustrates a system structure of a 5GS according to an embodiment of the disclosure. The network entity included in the network structure of the 5G system of FIG. 1 may include a network function (NF) according to system implementation.

Referring to FIG. 1, a 5G mobile communication network includes a UE 100, a fifth generation (5G) radio access network (RAN) 110, and a 5G core network. The 5G core network may include network functions, such as the access and mobility management function (AMF) 120 that provides a mobility management function of the UE, the session management function (SMF) 135 that provides a session management function, the user plane function (UPF) 130 that performs a data transfer role, a policy control function (PCF) 140 that provides a policy control function, a unified data management (UDM) 145 that provides data management functions, such as for subscriber data and policy control data, unified data repository (UDR) 150 that stores such various network functions, and a data network (DN) 175.

In the 5G system, the UE 100 may transmit or receive various application data through PDU sessions. A PDU session includes several traffic flows, and the traffic flows include two types: guaranteed bitrate quality-of-service flow (GBR QoS flow) and non-GBR QoS flow. The PCF 140 may determine the QoS (e.g., the authorized QoS including, e.g., the maximum allowed bitrate per SDF) to be provided to specific traffic represented as a service data flow (SDF), includes the corresponding information in a policy and charging control (PCC) rule, and transmits it to the SMF 135 to be applied when the SMF 135 generates a QoS flow.

In the 5G system, network slicing is a technique and structure that enables several virtualized, independent, logical networks in one physical network. The network operator may configure a virtual end-to-end network called a network slice and provides service to meet specified requirements for the service/application. A network slice may be identified by an identifier called single-network slice selection assistance information (S-NSSAI), and the UE transmits or receives data through the PDU session for each slice for allowed slices (S-NSSAIs).

The 5G system has a function for controlling the allowable maximum bitrate (MBR) for each network slice for each user (or UE). Specifically, in a specific S-NSSAI, the UE's maximum uplink (UL) bitrate (i.e., the sum of the bitrate sent on uplink through the non-GBR QoS flows and the guaranteed bitrate (GBR) for all the PDU sessions of the S-NSSAI) and maximum downlink (DL) bitrate (e.g., the sum of the GBR for all the PDU sessions of the S-NSSAI and the bitrate sent on downlink through the non-GBR QoS flows) are controlled not to exceed a predefined UL UE-slice-MBR and a predefined DL UE slice-MBR, respectively. In the UE registration procedure, the RAN 110 may receive the UE-slice-MBR value per S-NSSAI from the AMF 120 and, according to the context, reject a new QoS flow requested by the UE to control bitrate usage per S-NSSAI of the UE 100.

The 5G system also has a function for limiting the allowable maximum UL/DL MBR per network slice (limiting maximum bitrate per network slice) to control the bitrate for all the UEs transmitting/receiving traffic using a specific network slice to a predefined allowable maximum bitrate. The PCF 140 may receive the remaining maximum slice data rate per S-NSSAI from the UDR 150 and, upon determining the authorized QoS for the service data flows (SDFs) for a specific S-NSSAI, updates the UDR with the value resultant from subtracting the maximum bitrate allowed for the GBR SDF and non-GBR SDF from the remaining maximum slice data rate value of the S-NSSAI, as a new remaining maximum slice data rate value for the network slice. If the remaining maximum slice data rate value for the specific slice approaches 0, the PCF 140 may limit traffic for some flows (SDFs) for the network slice.

Hereinafter, the basic description or definitions of the messages transmitted or received between network entities in various embodiments of the disclosure may refer to the 3GPP standards, TS 23.501 and TS 23.502.

Figure 2:
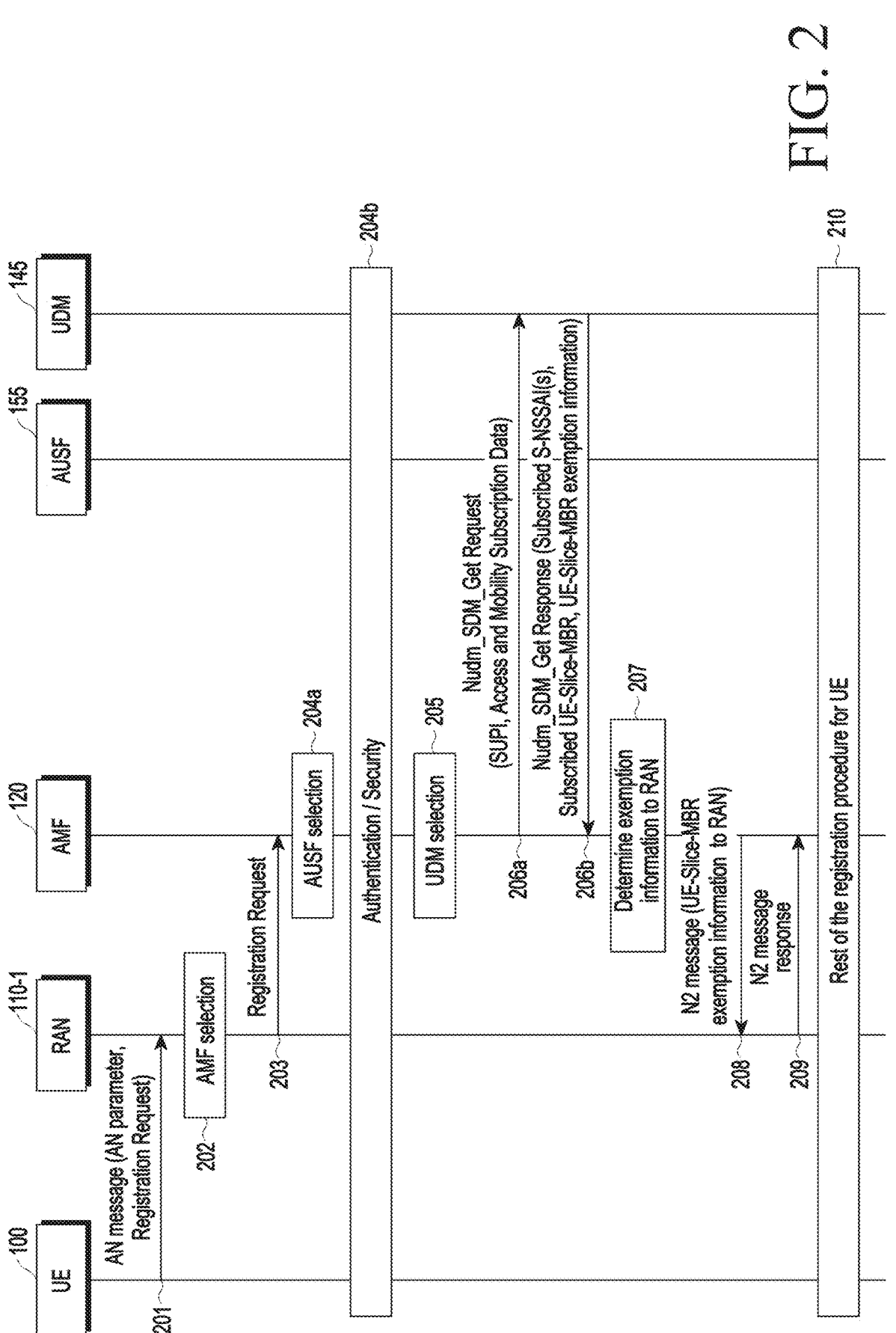
FIG. 2 illustrates a procedure for transferring exemption information about UE network slice bitrate limitations to a RAN in a UE registration procedure according to an embodiment of the disclosure.

FIG. 2 illustrates a procedure for transferring exemption information about UE network slice bitrate limitations to a RAN in a UE registration procedure according to an embodiment of the disclosure.

Referring to FIG. 2, the UE 100 transmits an access network (AN) message (AN parameter, registration request) to the RAN 110-1 in operation 201. The AN message may include, e.g., a UE identifier (e.g., subscription concealed identifier (SUCI), 5G-GUTI (which may include global unique or permanent equipment identifier (PEI)), a request NSSAI and/or UE mobility management (MM) core network capability). The registration request may include the following cause information (eg, a cause value) related to UE-Slice-MBR. The AN message may be understood as a radio resource control (RRC) Establishment Request message.

Upon receiving the AN message from the UE 100, the RAN 110-1 may select an AMF 120 based on the information in the AN message in operation 202.

The RAN 110-1 may transfer an N2 message to the AMF 120 based on the AN message received from the UE 100. The N2 message may include, e.g., a plurality of N2 parameters and a registration request. The plurality of N2 parameters may include a selected public land mobile network (PLMN) ID, UE location information and a UE context request in operation 203.

Upon determining that the UE 100 needs to be authenticated, the AMF 120 may select an authentication server function (AUSF) 155 based on the UE identifier (e.g., SUCI or subscription permanent identifier (SUPI)) in operation 204a.

An authentication procedure for the UE 100 is performed by the selected AUSF 155. According to an embodiment of the disclosure, when there is no NAS security context for the UE 100, a procedure for obtaining the same may be performed in operation 204b.

When subscription information is required for the UE 100, the AMF 120 selects the UDM 145 based on the UE identifier (SUCI or SUPI). The UDM 145 selects the UDR storing the subscription information about the UE in operation 205.

The AMF 120 may request access and mobility subscription information from the UDM 145 through a Nudm_SDM_Get Request message in operation 206a. According to an embodiment of the disclosure, the Nudm_SDM_Get Request message may include SUPI and access and mobility subscription data. According to an embodiment of the disclosure, in a specific context (e.g., when the proceeding UE registration procedure is caused due to a switch from the EPS to 5GS, if the determination is made by the local configuration of the AMF 120), information for requesting UE-Slice-MBR exemption information may be included in the Nudm_SDM_Get Request message transmitted by the AMF 120.

The UDM 145 may transmit a Nudm_SDM_Get response message to the AMF 120 in response to the Nudm_SDM_Get Request message in operation 206b. According to an embodiment of the disclosure, the Nudm_SDM_Get response message may include subscription information including the Subscribed UE-Slice-MBR and/or UE-Slice-MBR exemption information in operation

206b. According to an embodiment of the disclosure, in a specific context (e.g., in a case that the Nudm_SDM_Get request message received from the AMF 120 may include the requested information, in a case that the determination is made by the local configuration of the UDM, etc.), the UDM 145 may include UE-Slice-MBR exemption information in the Nudm_SDM_Get Request message.

According to an embodiment of the disclosure, the UE-Slice-MBR exemption information may include information about the target to be exempt from the UE-Slice-MBR limitations, and the UE-Slice-MBR exemption information may include at least one of the UE ID, S-NSSAI(s), list of services for exemptions (e.g., whether bitrate limitation for emergency services are exempt), and tracking area ID(s) (TAI(s)) (e.g., geographic location information that needs to be exceptionally processed). According to an embodiment of the disclosure, the UDM 145 may obtain the information, transmitted to the AMF 120, from the UDR 150 and transmit it to the AMF 120.

According to an embodiment of the disclosure, not only when the multimedia priority service (MPS) subscription information is valid in the network (UE) registration procedure, but also when the MPS subscription information about the UE 100 is changed to be valid (e.g., when a switch is made from a UE 100 not having MPS subscription to a UE 100 having MPS subscription), the UDM 145 may determine not to use the UE-Slice-MBR for the UE 100 or may determine that the UE-Slice-MBR is a very large value corresponding to an exemption of the bitrate limitation (for example, a predetermined value or a value greater than a predetermined threshold value may be used). When determining so, in the operation 206b, the UDM 145 may transmit a Nudm_SDM_Get response message including a UE-Slice-MBR having the changed large value or an indicator to deactivate the UE-Slice-MBR to the AMF 120, and then the AMF 120 may transmit the UE-Slice-MBR or the indicator to the RAN 110-1.

According to an embodiment of the disclosure, in an AM policy association or modification procedure with the PCF 140 after receiving the subscription information of the UE 100 from the UDM 145, although not shown in FIG. 2, the AMF 120 may transmit a subscribed UE-Slice-MBR to the PCF 140 and receive a modified UE-Slice-MBR from the PCF 140. For example, upon receiving, from the AMF 120, the indicator representing that the UE 100 is the UE having the MPS subscription or figuring out that the UE 100 has the MPS subscription, on its own, the PCF 140 may transmit a message including information that the UE-Slice-MBR for the UE 100 is set to the very large value or transmit a message indicating that the UE-Slice-MBR cannot be used for the UE 100 to the AMF 120.

The AMF 120 may determine "UE-Slice-MBR exemption information to RAN" information based on the message received from the PCF 140, the UE-Slice-MBR exemption information received from the UDM 145 and/or determination by the local configuration in operation 207. Furthermore, the "UE-Slice-MBR exemption information to RAN" may include information for updating or changing the UE-Slice-MBR to the very large value.

According to an embodiment of the disclosure, the "UE-Slice-MBR exemption information to RAN" may include at least one of the following information: UE ID, S-NSSAI(s), list of services for exemptions (e.g., whether bitrate limitation for emergency services are exempt), Tracking Area ID(s) (TAI(s)), PDU Session ID(s).

The AMF 120 may transmit the UE-Slice-MBR exemption information to RAN to the RAN 110-1 through the N2 message in operation 208. The RAN 110-1 may exempt the UE-Slice-MBR limitations for traffic corresponding to the "UE-Slice-MBR exemption information to RAN".

According to an embodiment of the disclosure, upon receiving the subscribed UE-Slice-MBR from the UDM 145 in the operation 206b or in each of the following 1) to 3) cases despite receiving the UE-Slice-MBR from the PCF 140, the AMF 120 does not provide the UE-Slice-MBR to the RAN 110-1 or may provide information to deactivate the UE-Slice-MBR for the UE to the RAN 110-1 or information for updating/changing the UE-Slice-MBR to the very large value:

1) In a case that the cause value included in the RRC establishment request message received by the AMF 120 in the operation 203 indicates a priority service (e.g., multimedia priority service (MPS)), wherein the RRC Establishment Request corresponds to the AN message in the operation 201, the AN message includes the registration request, and the registration request received by the AMF 120 in the operation 203 may include the Cause value.

2) In a case that the UE 100 is the UE having the MPS subscription,

3) In a case that the cause value included in the RRC establishment request message received by the AMF 120 in operation 203 represents the UE 100 requesting an emergency service or the emergency service, according to an embodiment of the disclosure, the RAN 110-1 transmits an N2 message response message to the AMF 120 in response to the N2 message in operation 209. The remaining UE registration procedure proceeds in operation 210.

Figure 3A:
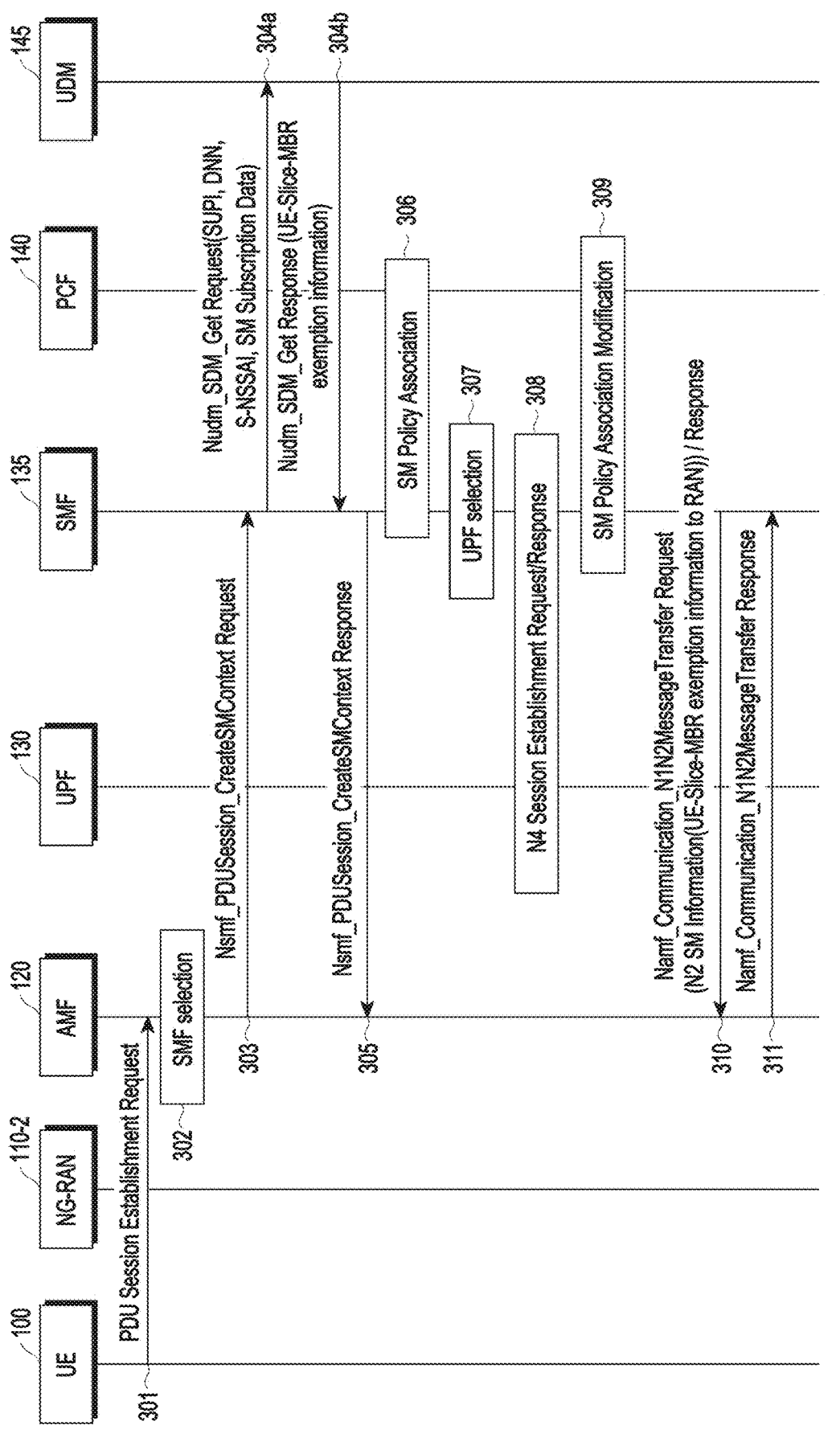
FIGS. 3A and 3B illustrate a procedure for transferring exemption information about UE network slice bitrate limitations to a RAN in a PDU session create procedure according to various embodiments of the disclosure.
Figure 3B:
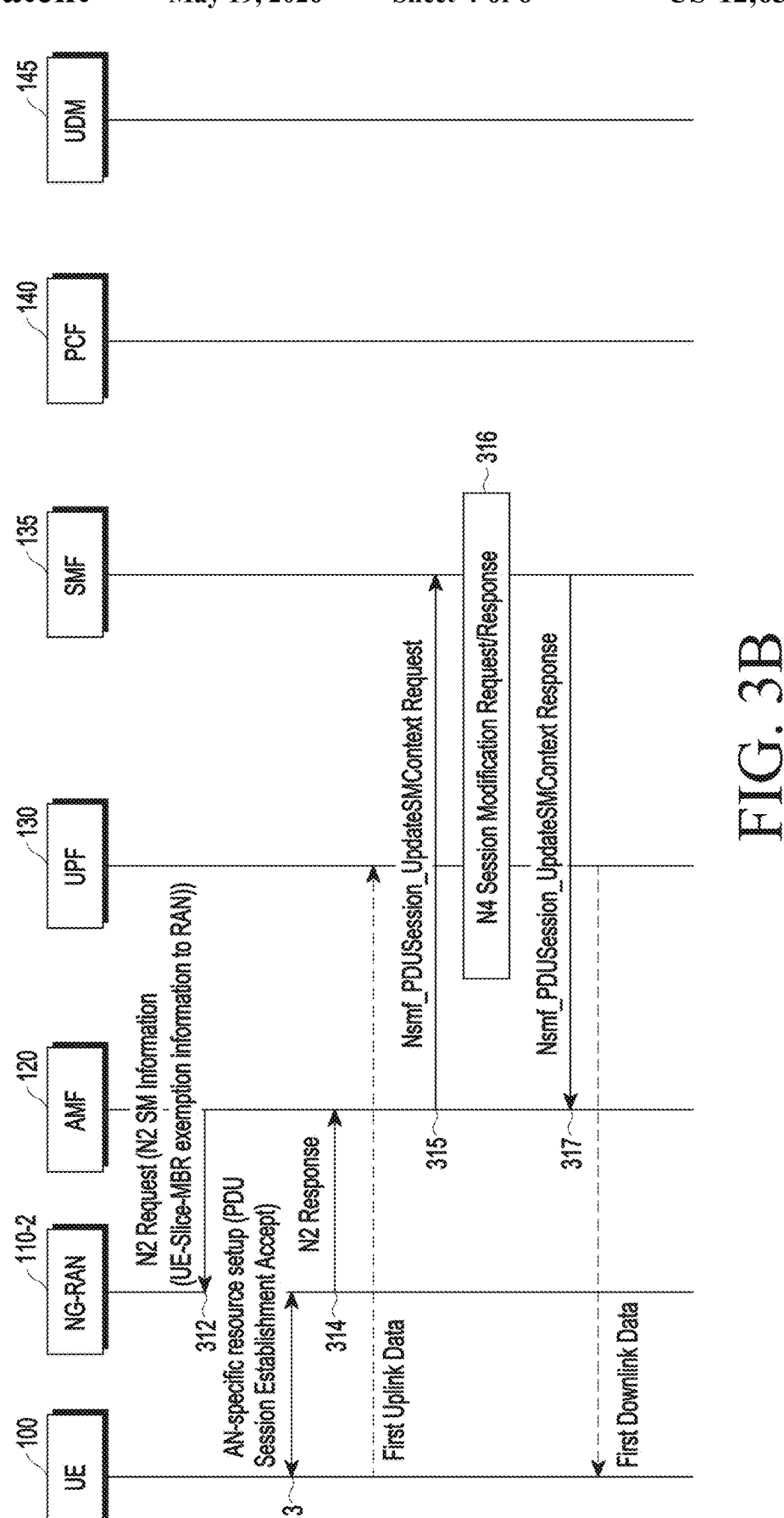

FIGS. 3A and 3B illustrate a procedure for transferring exemption information about UE slice bitrate limitations to a RAN in a PDU session create procedure according to various embodiments of the disclosure.

Referring to FIGS. 3A and 3B, the UE 100 transmits a PDU session establishment request message to the AMF 120 to create a new PDU session in operation 301. According to an embodiment of the disclosure, the PDU session establishment request message may include S-NSSAI and DNN.

The AMF 120 performs an SMF selection procedure for creating a new PDU session in operation 302.

The AMF 120 transmits a Nsmf_PDUSession_CreateSM-Context Request to the selected SMF 135 in operation 303.

The SMF 135 transmits, to the UDM 145, a Nudm_SDM_Get Request message to the UDM 145 for requesting SM subscription data in operation 304a. According to an embodiment of the disclosure, the Nudm_SDM_Get Request message may include at least one of SUPI, session management subscription data, selected DNN, S-NSSAI of the HPLMN, serving PLMN ID, and [NID]. According to an embodiment of the disclosure, other subscription data may be additionally requested. According to an embodiment of the disclosure, in a specific context (e.g., when the proceeding PDU session create procedure is caused due to a switch from the EPS to 5GS, if the determination is made by the local configuration of the SMF), information for requesting UE-Slice-MBR exemption information may be included in the Nudm_SDM_Get Request message transmitted by the SMF 135.

The UDM 145 may transmit a Nudm_SDM_Get response message to the SMF 135 in response to the Nudm_SDM_Get Request message received from the SMF 135 in operation 304b. The Nudm_SDM_Get response message transmitted by the UDM 145 may include subscription information including UE-Slice-MBR exemption information. According to an embodiment of the disclosure, in a specific context (e.g., when the message from the SMF includes the requested information, if the determination is made by the local configuration of the UDM), the UDM 145 may include UE-Slice-MBR exemption information in the Nudm_SDM_Get Response message.

According to an embodiment of the disclosure, the UE-Slice-MBR exemption information included in the Nudm_SDM_Get Response message may include information about the target to be exempt from the UE-Slice-MBR limitations and may include at least one of the UE ID, S-NSSAI(s), list of services for exemptions (e.g., whether emergency services are exempt), and tracking area ID(s) (TAI(s)) (e.g., geographic location information that needs to be exceptionally processed).

According to an embodiment of the disclosure, the UDM 145 may obtain the information, transmitted to the SMF 135, from the UDR and transmit it to the AMF 120.

Upon receiving the Nudm_SDM_Get Response message from the UDM 145, the SMF 135 transmits a Nsmf_P-DUSession_CreateSMContext Response message to the AMF 120 as a response message to the Nsmf_PDUSession_CreateSMContext Request message received in operation 303 in operation 305. According to an embodiment of the disclosure, the SMF 135 may perform optional secondary authentication/authorization for the PDU session through a data network-authentication, authorization and accounting (DN-AAA) server.

The SMF 135 may perform a procedure for selecting the PCF 140 and performs a session management (SM) policy association establishment procedure with the PCF 140 for the newly created PDU session in operation 306.

The SMF 135 performs a procedure for selecting the UPF 130 for the PDU session in operation 307.

The SMF 135 sends an N4 session creation request for the PDU session to the UPF 130, and the UPF 130 transmits a response message thereto in operation 308.

When the policy control request (PCR) trigger condition received from the PCF 140 is met in operation 306, the SMF 135 performs an SM policy association modification procedure and transmits information corresponding to the PCR trigger to the PCF 140 in operation 309.

The SMF 135 transmits a Namf_Communication_N1N2messagetransfer Request message to the AMF 120. According to an embodiment of the disclosure, the Namf_Communication_N1N2MessageTransfer Request message may include at least one of the PDU session ID, N2 SM information, and N1 SM container in operation 310. According to an embodiment of the disclosure, the PDU session ID may be, e.g., the ID generated by the SMF 135, for the PDU session requested to be created.

According to an embodiment of the disclosure, N2 SM information is information transmitted to the NG-RAN 110-2, and the N1 SM container is information transmitted to the UE 100.

In operation 304b, the SMF 135 may receive UE-Slice-MBR exemption information or may determine the UE-Slice-MBR exemption information To RAN based on the determination by local configuration. According to an embodiment of the disclosure, the UE-Slice-MBR exemption information to RAN may be included in the N2 SM information.

According to an embodiment of the disclosure, the UE-Slice-MBR exemption information to RAN may include at least one of the UE ID, S-NSSAI(s), list of services for exemptions (e.g., whether emergency services are exempt), tracking area ID(s) (TAI(s), and PDU session ID(s).

According to an embodiment of the disclosure, the N2 SM information may include at least one of PDU session ID, QFI(s), QoS profile(s), CN tunnel info, S-NSSAI from the allowed NSSAI, and session-AMBR PDU session type.

According to an embodiment, the N1 container may include a PDU session establishment accept (e.g., at least one of [QoS rule(s) and QoS flow level QoS parameters if needed for the QoS flow(s) associated with the QoS rule(s)], selected SSC mode, S-NSSAI(s), UE requested DNN, allocated IPv4 address, interface identifier and session-AMBR, selected PDU session type).

The AMF 120 may transmit a Namf_Communication_N1N2MessageTransfer Response message to the SMF 135 in response to the Namf_Communication_N1N2MessageTransfer Request message in operation 311.

The AMF 120 may transmit an N2 request message to the NG-RAN 110-2 in operation 312. According to an embodiment of the disclosure, the N2 request message transmits at least one of N2 SM information, NAS message (PDU session ID, N1 SM container (PDU session establishment accept)) in operation 312.

The NG-RAN 110-2 may perform resource setup for the UE 100 and the access network (AN) based on the N2 request message received from the SMF 135. According to an embodiment of the disclosure, the NG-RAN 110-2 may transmit a PDU session establishment accept message for the QoS rule through an RRC connection reconfiguration procedure with the UE 100 in operation 313.

According to an embodiment of the disclosure, if the received N2 request message includes UE-Slice-MBR exemption information to RAN information, the NG-RAN 110-2 performs exemption of the traffic corresponding to the information from UE-Slice-MBR.

The NG-RAN 110-2 may transmit an N2 response message to the AMF 120 in operation 314. According to an embodiment of the disclosure, the N2 response message may include at least one of PDU session ID, cause N2 SM information (PDU session ID, AN tunnel info, list of accepted or rejected QFI(s)).

According to an embodiment of the disclosure, the list of accepted or rejected QFI(s) (QoS flow ID(s)) included in the N2 SM information include information about the result of accepting/rejecting each QoS flow of the PDU session by the NG-RAN 110-2.

The AMF 120 may transmit an Nsmf_PDUSession_UpdateSMContext Request message to the SMF 135 in operation 315.

The SMF 135 may transmit an N4 session modification request message to the UPF 130. When the UPF 130 receives, from the SMF 135, the N4 session modification request message, the UPF 130 transmits an N4 session modification response message in operation 316.

The SMF 135 may transmit a Nsmf_PDUSession_UpdateSMContext Response message to the AMF 120 based on the N4 Session Modification Response message received from the UPF 130 in operation 317.

Figure 4:
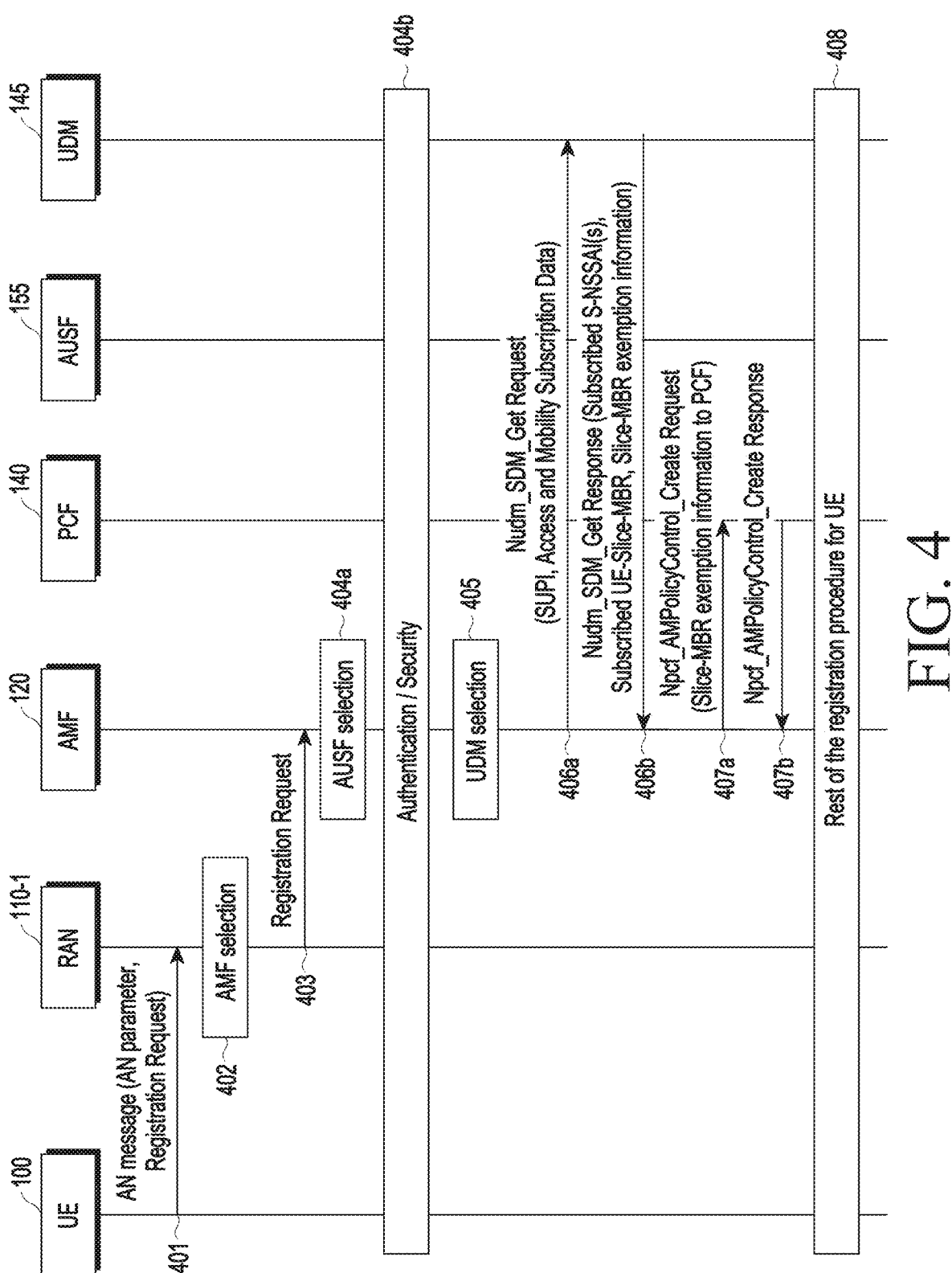
FIG. 4 illustrates a procedure for transferring exemption information about network slice bitrate limitations to a PCF in a UE registration procedure according to an embodiment of the disclosure.

FIG. 4 illustrates a procedure for transferring exemption information about network slice bitrate limitations to a PCF in a UE registration procedure according to an embodiment of the disclosure.

The UE 100 may transmit an AN message to the RAN 110-1 in operation 401. The AN message may include an AN parameter and/or a registration request. According to an embodiment of the disclosure, the registration request message may include at least one of the UE identifier (e.g., SUCI, 5G-GUTI, or PEI) and requested NSSAI UE MM core network capability.

The RAN 110-1 may select the AMF 120 based on the information in the AN message received from the UE 100 in operation 402.

The RAN 110-1 may transmit an N2 message to the AMF 120 in operation 403. According to an embodiment of the disclosure, at least one of N2 parameters or registration request may be included. According to an embodiment of the disclosure, the N2 parameter included in the N2 message may include at least one of the selected PLMN ID and UE location information UE context request.

Upon determining that UE authentication is needed, the AMF 120 may select the AUSF 155 based on the UE identifier (e.g., SUCI or SUPI) in operation 404a.

An authentication procedure for the UE is performed through the AUSF 155 selected by the AMF 120 in operation 404b. According to an embodiment of the disclosure, when there is no NAS security context for the UE 100, a procedure for obtaining the same is performed.

When subscription information is required for the UE 100, the AMF 120 may select the UDM 145 based on the UE identifier (e.g., SUCI or SUPI) in operation 405. According to an embodiment of the disclosure, the UDM 145 may select the UDR storing subscription information for the UE 100.

The AMF 120 may transmit a Nudm_SDM_Get Request message to the UDM 145 to request access and mobility subscription information for the UE 100 in operation 406a. According to an embodiment of the disclosure, the Nudm_SDM_Get Request may include SUPI and/or access and mobility subscription data.

According to an embodiment of the disclosure, in a specific context (e.g., when the proceeding UE registration procedure is caused due to a switch from the EPS to 5GS, if the determination is made by the local configuration of the AMF), information for requesting Slice-MBR exemption information may be included in the Nudm_SDM_Get Request message.

The UDM 145 may transmit a Nudm_SDM_Get Response message in response to the Nudm_SDM_Get Request message received from the AMF 120 in operation 406b. The Nudm_SDM_Get response message may include slice-MBR exemption information. According to an embodiment of the disclosure, in a specific context (e.g., when the message from the AMF includes the requested information, if the determination is made by the local configuration of the UDM), the slice-MBR exemption information may be included in the Nudm_SDM_Get Response message.

The slice-MBR exemption information may include information about the target to be exempt from the UE-Slice-MBR limitations and may include at least one of the UE ID, S-NSSAI(s), list of services for exemptions (e.g., whether emergency services are exempt), and tracking area ID(s) (TAI(s)) (i.e., geographic location information that needs to be exceptionally processed).

According to an embodiment of the disclosure, the UDM 145 may obtain the information, transmitted to the AMF 120, from the UDR and transmit it to the AMF 120.

The AMF 120 may determine slice-MBR exemption information to RAN based on the received Slice-MBR exemption information or determination by the local configuration.

The slice-MBR exemption information to RAN may include at least one of the UE ID, S-NSSAI(s), list of services for exemptions (e.g., whether emergency services are exempt), tracking area ID(s) (TAI(s), PDU session ID(s), and the slice-MBR exemption information received in operation 406*b*.

The AMF 120 may transmit a Npcf_AMPolicy Control_Create Request to the PCF 140 in operation 407*a*. According to an embodiment of the disclosure, in a specific context (e.g., upon receiving the slice-MBR exemption information in operation 406*b*, determination by the local configuration of the AMF), the Npcf_AMPolicy Control_Create Request message may include the UE-Slice-MBR exemption information to RAN.

The PCF 140 may transmit a Npcf_AMPolicy Control_Create Response message to the AMF 120 in response to the Npcf_AMPolicyControl_Create Request in operation 407*b*. The PCF 140 may perform exemption from the maximum bitrate limitations per slice for the traffic corresponding to the slice-MBR exemption information to PCF in the slice-MBR exemption information to PCF based on the slice-MBR exemption information to PCF included in the received Npcf_AMPolicyControl_Create Request. If the bitrate limitation exemption is performed, the PCF 140 does not update the remaining maximum slice data rate per S-NSSAI for the bitrate for the corresponding traffic.

The remaining UE registration procedure may proceed in operation 408.

Figure 5A:
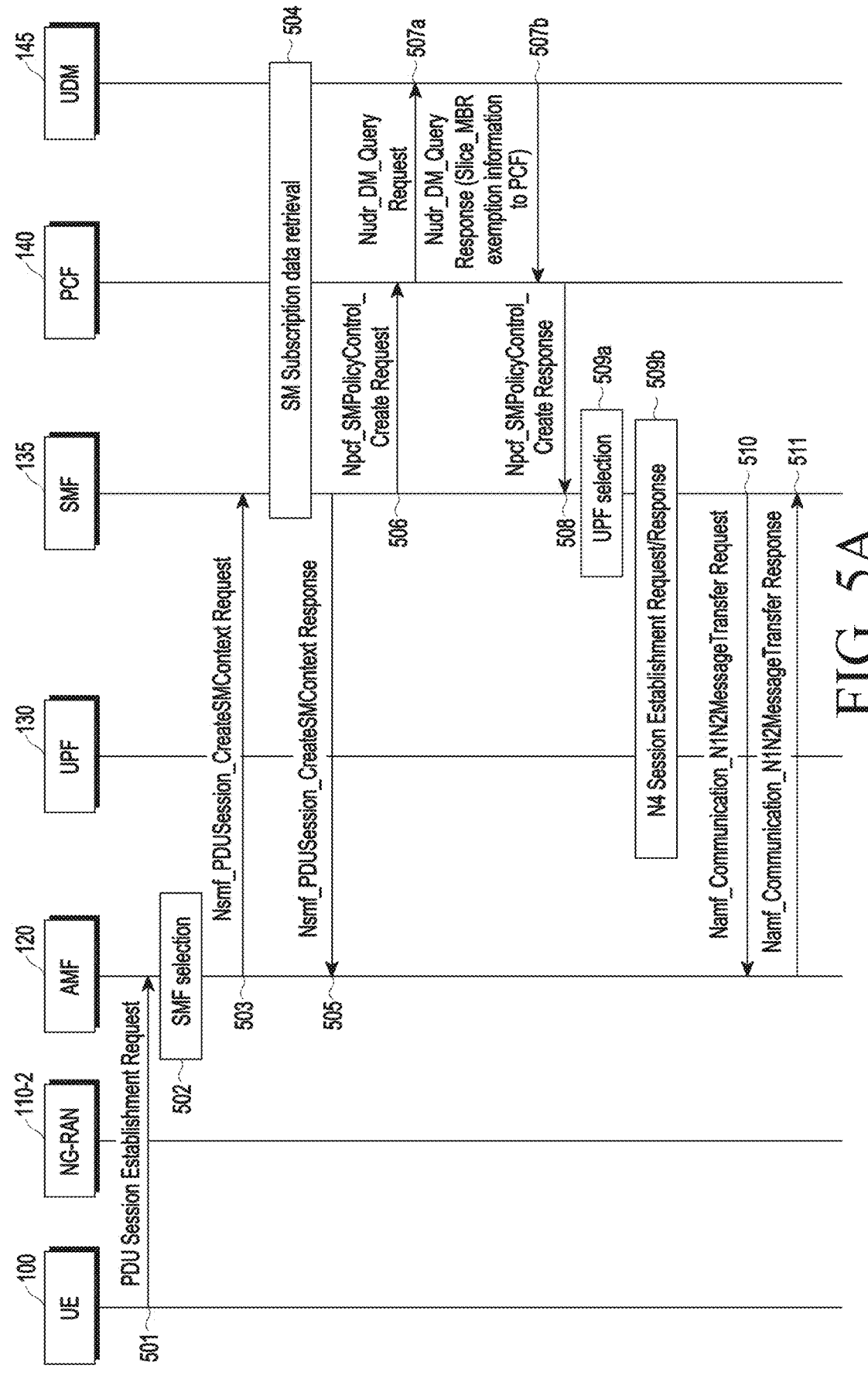
FIGS. 5A and 5B illustrate a procedure for transferring exemption information about network slice bitrate limitations to a PCF in a PDU session create procedure according to various embodiments of the disclosure.
Figure 5B:
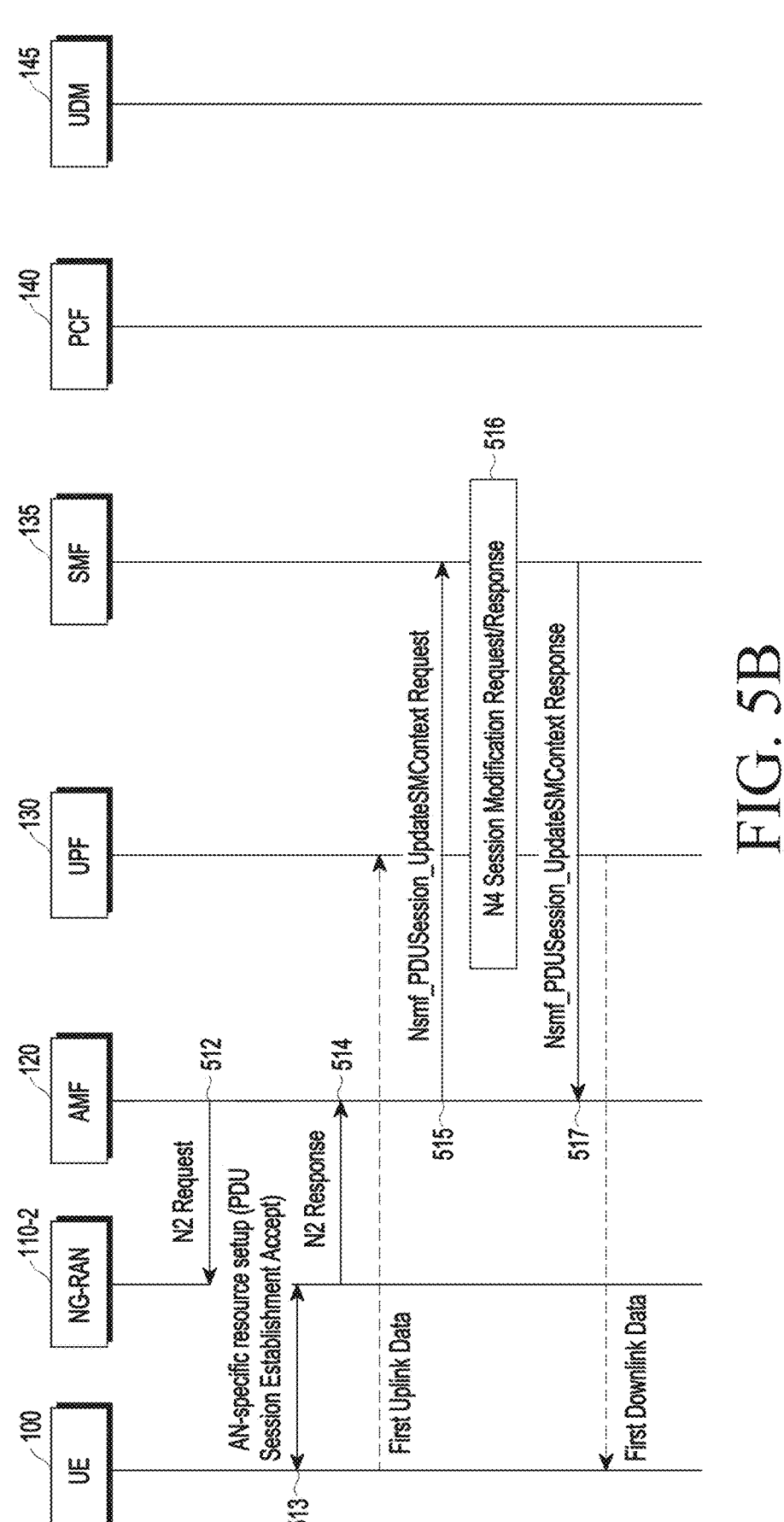

FIGS. 5A and 5B illustrate a procedure for transferring exemption information about network slice bitrate limitations to a PCF in a PDU session create procedure according to various embodiments of the disclosure.

Referring to FIGS. 5A and 5B, the UE 100 may transmit a PDU session establishment request message to the AMF 120 to request to create a PDU session in operation 501. According to an embodiment of the disclosure, the PDU session establishment request message may include S-NS-SAI and/or DNN.

The AMF 120 may perform an SMF selection procedure for the new PDU session based on the received PDU session establishment request message in operation 502.

The AMF 120 may transmit a Nsmf_PDUSession_CreateSMContext Request to the SMF 135 in operation 503.

The SMF 135 may transmit a Nudm_SDM_Get message to the UDM 145 to obtain SM subscription data in operation 504.

The SMF 135 may transmit a Nsmf_PDUSession_CreateSMContext Response message to the AMF 120 in response to the Nsmf_PDUSession_CreateSMContext Request message received in operation 503 in operation 505.

According to an embodiment of the disclosure, the SMF 135 may perform optional secondary authentication/authorization for the PDU session through a DN-AAA server.

The SMF 135 may perform a procedure for selecting the PCF 140 and may transmit a Npcf_SMPolicyControl_Create Request to the PCF 140 to perform a session management (SM) policy association establishment procedure with the PCF for the PDU session in operation 506.

The PCF 140 may transmit a Nudr_DM_Query_Request message to the UDM 145 in operation 507*a*.

According to an embodiment of the disclosure, in a specific context (e.g., determination by the PCF local configuration, or PDU session switched from EPS to 5GS), the Nudr_DM_Query_Request message may include information requesting slice-MBR exemption information.

The UDM 145 may transmit a Nudr_DM_Query_Response message to the PCF 140 in response to the Nudr_DM_Query_Request message in operation 507*b*. According to an embodiment of the disclosure, the Nudr_DM_Query_Response message may include the remaining maximum slice data rate per S-NSSAI and/or maximum slice data rate per S-NSSAI.

According to an embodiment of the disclosure, in a specific context (e.g., determination by the UDM local configuration, or when the message sent by the PCF 140 in operation 507*b* includes information requesting slice-MBR exemption information), the Nudr_DM_Query_Response message may include slice-MBR exemption information to PCF.

According to an embodiment of the disclosure, the slice-MBR exemption information may include information about the target to be exempt from the UE-Slice-MBR limitations and may include at least one of the UE ID, S-NSSAI(s), list of services for exemptions (e.g., whether emergency services are exempt), and tracking area ID(s) (TAI(s)) (i.e., geographic location information that needs to be exceptionally processed).

The PCF 140 may transmit a Npcf_SMPolicy Control_Create Response message to the SMF 135 in response to the Npcf_SMPolicyControl_Create Request message received in operation 506 in operation 508. When the PCF 140 receives the slice-MBR exemption information to PCF in the Nudr_DM_Query_Response message, it performs exemption from the maximum bitrate limitations per slice for the traffic corresponding to the slice-MBR exemption information to PCF. The PCF 140 does not update the remaining maximum slice data rate per S-NSSAI for the bitrate for the corresponding traffic.

The SMF 135 may perform a UPF selection procedure for the new PDU session in operation 509*a*.

The SMF 135 may send an N4 session creation request for the new PDU session to the UPF 130, and the UPF 130 transmits a response message thereto in operation 509*b*.

The SMF 135 may transmit a Namf_Communication_N1N2messagetransfer Request message to the AMF 120 in operation 510. According to an embodiment of the disclosure, the Namf_Communication_N1N2MessageTransfer Request message may include the PDU session ID, N2 SM information, and/or N1 SM container.

The PDU session ID included in the Namf_Communication_N1N2MessageTransfer Request message is the ID generated by the SMF for the PDU session requested to be generated, the N2 SM information is information sent to the NG-RAN 110-2, and the N1 SM container is information sent to the UE 100.

The N2 SM information included in the Namf_Communication_N1N2MessageTransfer Request message may include PDU session ID, QFI(s), QoS profile(s), CN tunnel info, S-NSSAI from the allowed NSSAI and/or session-AMBR, PDU session type.

The N1 SM container included in the Namf_Communication_N1N2MessageTransfer Request message may include a PDU session establishment accept (at least one of [QoS rule(s) and QoS flow level QoS parameters if needed for the QoS flow(s) associated with the QoS rule(s)], selected SSC mode, S-NSSAI(s), UE requested DNN, allocated IPv4 address, interface identifier and session-AMBR, selected PDU session type).

The AMF 120 may transmit a Namf_Communication_N1N2MessageTransfer Response message to the SMF 135 in response to the Namf_Communication_N1N2MessageTransfer Request message in operation 511.

The AMF 120 may transmit an N2 request message to the NG-RAN 110-2 in operation 512. According to an embodiment of the disclosure, the N2 request message may include N2 SM information and/or NAS message (PDU session ID, N1 SM container (PDU session establishment accept)).

The NG-RAN 110-2 may perform resource setup with the UE 100 for the access network (AN) based on information in the N2 request message received from the SMF 135 in operation 513.

According to an embodiment of the disclosure, the NG-RAN 110-2 may transmit a PDU session establishment accept message for the QoS rule through an RRC connection reconfiguration procedure with the UE 100.

The NG-RAN 110-2 may transmit an N2 response to the AMF 120 in response to the received N2 request message in operation 514. According to an embodiment of the disclosure, the N2 response message may include at least one of PDU session ID, cause N2 SM information (PDU session ID, AN tunnel info, list of accepted or rejected QFI(s)).

According to an embodiment of the disclosure, the list of accepted or rejected QFI(s) (QoS flow ID(s)) included in the N2 response message include information about the result of accepting/rejecting each QoS flow of the PDU session by the NG-RAN 110-2.

The AMF 120 may transmit, to the SMF 135, a Nsmf_P-DUSession_UpdateSMContext Request message in operation 515.

The SMF 135 may transmit an N4 session modification request message to the UPF 130. In response to the N4 session modification request message, the UPF 130 transmits an N4 session modification response message to the SMF 135 in operation 516.

The SMF 135 may transmit, to the AMF 120, a Nsmf_P-DUSession_UpdateSMContext Response message in operation 517.

According to the device and method according to various embodiments of the disclosure, as described above, there is proposed a method for exemption from slice-related bitrate limitations for traffic in contexts where traffic of services or session continuity needs to be ensured, such as in emergency services, to prevent such an occasion where the traffic is rejected or limited.

Figure 6:
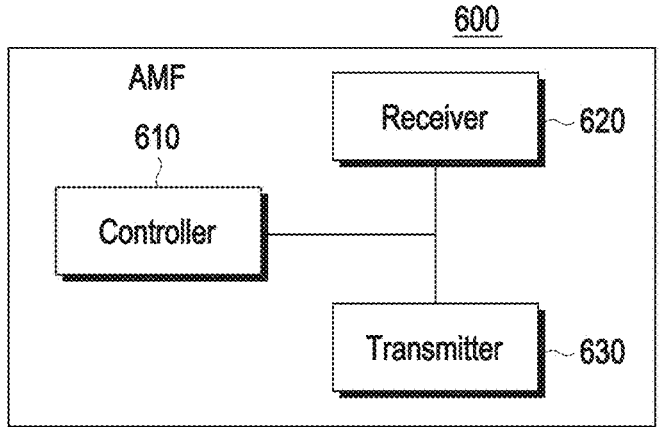
FIG. 6 is a view schematically illustrating an internal structure of an AMF according to an embodiment of the disclosure.

FIG. 6 is a view schematically illustrating an internal structure of an AMF 600 according to an embodiment of the disclosure.

Referring to FIG. 6, an AMF 600 may include a controller 610, a receiver 620, and a transmitter 630.

The controller 610 may control the overall operation of the AMF 600, and in particular, controls to perform operations related to exemption from network slice bitrate limitations upon creating a PDU session. The operation of controlling the AMF 600 by the controller 610 is substantially the same as those described above in connection with FIGS. 2, 3A, 3B, 4, 5A, and 5B, and no further detailed description thereof is given below.

The receiver 620 may receive various messages and information under the control of the controller 610.

The transmitter 630 may transmit various messages and information under the control of the controller 610.

Although FIG. 6 illustrates an example in which in the AMF 600, the controller 610, the receiver 620, and the transmitter 630 are implemented as separate units, at least two of the controller 610, the receiver 620, and the transmitter 630 may be integrated into one. The controller 610, the receiver 620, and the transmitter 630 may be implemented as at least one processor.

Figure 7:
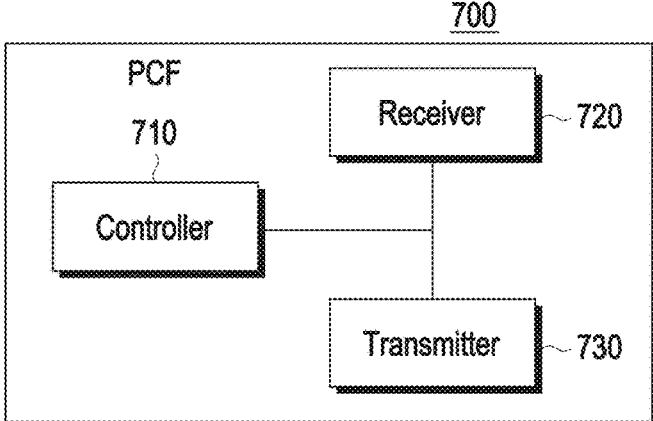
FIG. 7 is a view schematically illustrating an internal structure of an PCF according to an embodiment of the disclosure.

FIG. 7 is a view schematically illustrating an internal structure of an PCF 700 according to an embodiment of the disclosure.

Referring to FIG. 7, an PCF 700 includes a controller 710, a receiver 720, and a transmitter 730.

The controller 710 may control the overall operation of the PCF 700, and in particular, controls to perform operations related to exemption from network slice bitrate limitations upon creating a PDU session. The operation of controlling the PCF 700 by the controller 710 is substantially the same as those described above in connection with FIGS. 2, 3A, 3B, 4, 5A, and 5B, and no further detailed description thereof is given below.

The receiver 720 may receive various messages and information under the control of the controller 710.

The transmitter 730 may transmit various messages and information under the control of the controller 710.

Although FIG. 7 illustrates an example in which in the PCF 700, the controller 710, the receiver 720, and the transmitter 730 are implemented as separate units, at least two of the controller 710, the receiver 720, and the transmitter 730 may be integrated into one (e.g. a transceiver). The controller 710, the receiver 720, and the transmitter 730 may be implemented as at least one processor.

Figure 8:
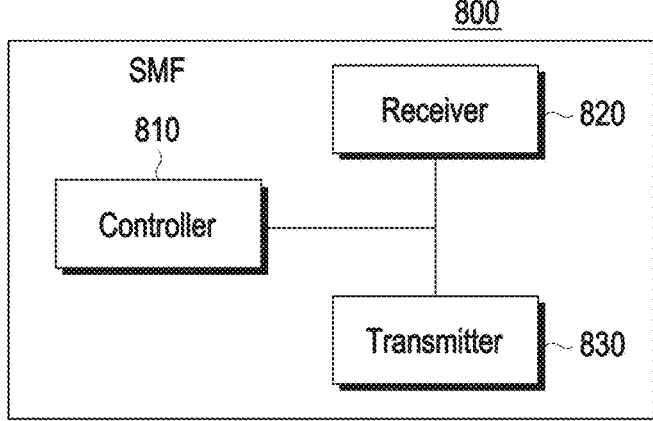
FIG. 8 is a view schematically illustrating an internal structure of an SMF according to an embodiment of the disclosure.

FIG. 8 is a view schematically illustrating an internal structure of an SMF 800 according to an embodiment of the disclosure.

Referring to FIG. 8, an SMF 800 includes a controller 810, a receiver 820, and a transmitter 830.

The controller 810 may control the overall operation of the SMF 800, and in particular, controls to perform operations related to exemption from network slice bitrate limitations upon creating a PDU session. The operation of controlling the SMF 800 by the controller 810 is substantially the same as those described above in connection with FIGS. 2, 3A, 3B, 4, 5A, and 5B, and no further detailed description thereof is given below.

The receiver 820 may receive various messages and information under the control of the controller 810.

The transmitter 830 may transmit various messages and information under the control of the controller 810.

Although FIG. 8 illustrates an example in which in the SMF 800, the controller 810, the receiver 820, and the transmitter 830 are implemented as separate units, at least two of the controller 810, the receiver 820, and the transmitter 830 may be integrated into one (e.g. a transceiver). The controller 810, the receiver 820, and the transmitter 830 may be implemented as at least one processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an access and mobility management function (AMF) in a wireless communication system supporting bitrate limitation for a network slice, the method comprising:

receiving, via a radio access network (RAN) from a user equipment (UE), a registration request including cause information associated with an allowable maximum bitrate (MBR) for the UE; and determining, based on the cause information, a message received from a policy control function (PCF), and UE-Slice-MBR exemption information received from an unified data management (UDM), whether to transmit information related to an exemption of the bitrate limitation to the RAN, wherein the information related to the exemption of the bitrate limitation comprises at least one of UE identifier (ID), single network slice selection assistance information (S-NSSAI), a list of services for exemption, a tracking area ID or a protocol data unit (PDU) session ID, wherein the cause information comprises a cause value indicating a priority service, and wherein the message received from the PCF comprises information of a UE-Slice-MBR for the UE and an indicator that the UE-Slice-MBR cannot be used for the UE.

2. The method of claim 1, wherein the information related to an exemption of the bitrate limitation comprises:

information to deactivate the MBR for the UE, or information for changing the MBR to a large value corresponding to the exemption of the bitrate limitation.

3. The method of claim 1, further comprising transmitting, to the RAN, the information related to the exemption of the bitrate limitation, in case that the cause information represents that the UE requests an emergency service.

4. The method of claim 1, further comprising transmitting, to the RAN, the information related to the exemption of the bitrate limitation, in case that the UE is a UE having a multimedia priority service (MPS) subscription.

5. The method of claim 1, further comprising:

receiving, from a first network entity, information representing the MBR for the UE; and determining, based on the cause information, whether to provide the RAN with the information representing the MBR.

6. An access and mobility management function (AMF) in a wireless communication system supporting bitrate limitation for a network slice, the AMF comprising:

a transceiver; and at least one processor coupled with the transceiver and configured to:

receive, via a radio access network (RAN) from a user equipment (UE), a registration request including cause information associated with allowable maximum bitrate (MBR) for the UE, and determine, based on the cause information, a message received from a policy control function (PCF), and UE-Slice-MBR exemption information received from an unified data management (UDM), whether to transmit information related to an exemption of the bitrate limitation to the RAN, wherein the information related to the exemption of the bitrate limitation comprises at least one of UE identifier (ID), single network slice selection assistance information (S-NSSAI), a list of services for exemption, a tracking area ID or a protocol data unit (PDU) session ID, wherein the cause information comprises a cause value indicating a priority service, wherein the message received from the PCF comprises information of a UE-Slice-MBR for the UE and an indicator that the UE-Slice-MBR cannot be used for the UE.

7. The AMF of claim 6, wherein the information related to an exemption of the bitrate limitation comprises:

information to deactivate the MBR for the UE, or information for changing the MBR to a large value corresponding to the exemption of the bitrate limitation.

8. The AMF of claim 6, wherein the at least one processor is further configured to transmit, to the RAN, the information related to the exemption of the bitrate limitation, in case that the cause information represents that the UE requests an emergency service.

9. The AMF of claim 6, wherein the at least one processor is further configured to transmit, to the RAN, the information related to the exemption of the bitrate limitation, in case that the UE is a UE having a multimedia priority service (MPS) subscription.

10. The AMF of claim 6, wherein the at least one processor is further configured to:

receive, from a first network entity, information representing the MBR for the UE, and determine, based on the cause information, whether to provide the RAN with the information representing the MBR.

11. A method performed by an access and mobility management function (AMF) in a wireless communication system supporting bitrate limitation for a network slice, the method comprising:

receiving, via a radio access network (RAN) from a user equipment (UE), a registration request;

transmitting, to a unified data management (UDM), a request message for requesting subscription information for the UE;

receiving, from the UDM, a response message including the subscription information for the UE;

performing a policy association or modification procedure with a policy control function (PCF); and transmitting, to the RAN, allowable maximum bitrate (MBR) exemption information for the UE in case that the AMF obtains information related to an exemption of the bitrate limitation from the UDM or the PCF, wherein the allowable MBR exemption information is determined by the information related to the exemption of the bitrate limitation, a message received from the PCF, and UE-Slice-MBR exemption information received from the UDM, wherein the information related to the exemption of the bitrate limitation comprises at least one of UE identifier (ID), single network slice selection assistance information (S-NSSAI), a list of services for exemption, a tracking area ID or a protocol data unit (PDU) session ID, wherein the information related to the exemption of the bitrate limitation comprises cause information indicating a priority service, and wherein the message received from the PCF comprises information of a UE-Slice-MBR for the UE and an indicator that the UE-Slice-MBR cannot be used for the UE.

12. The method of claim 11, wherein the information related to an exemption of the bitrate limitation comprises:

information to deactivate the MBR for the UE, or information for changing the MBR to a large value corresponding to the exemption of the bitrate limitation.

13. The method of claim 11, wherein the MBR exemption information comprises at least one of information about a target to be exempt from the bitrate limitation, an identification (ID) of UE, single-network slice selection assistance information (S-NSSAI) of the network slice, the list of services for the exemption, or location information that needs to be exceptionally processed, and wherein the MBR exemption information comprises information for changing the MBR to a large value corresponding to the exemption of the bitrate limitation.

14. The method of claim 11, further comprising determining the MBR exemption information based on at least one of the information related to an exemption of the bitrate limitation or logical configuration.

15. An access and mobility management function (AMF) in a wireless communication system supporting bitrate limitation for a network slice, the AMF comprising:

a transceiver; and at least one processor coupled with the transceiver and configured to:

receive, via a radio access network (RAN) from a user equipment (UE), a registration request, transmit, to a unified data management (UDM), a request message for requesting subscription information for the UE, receive, from the UDM, a response message including the subscription information for the UE, perform a policy association or modification procedure with a policy control function (PCF), and transmit, to the RAN, allowable maximum bitrate (MBR) exemption information for the UE in case that the AMF obtains information related to an exemption of the bitrate limitation from the UDM or the PCF, wherein the allowable MBR exemption information is determined by the information related to the exemption of the bitrate limitation, a message received from the PCF, and UE-Slice-MBR exemption information received from the UDM, wherein the information related to the exemption of the bitrate limitation comprises at least one of UE identifier (ID), single network slice selection assistance information (S-NSSAI), a list of services for exemption, a tracking area ID or a protocol data unit (PDU) session ID, wherein the information related to the exemption of the bitrate limitation comprises cause information indicating a priority service, and wherein the message received from the PCF comprises information of a UE-Slice-MBR for the UE and an indicator that the UE-Slice-MBR cannot be used for the UE.

16. The AMF of claim 15, wherein the information related to an exemption of the bitrate limitation comprises:

information to deactivate the MBR for the UE, or information for changing the MBR to a large value corresponding to the exemption of the bitrate limitation.

17. The AMF of claim 15, wherein the MBR exemption information comprises at least one of information about a target to be exempt from the bitrate limitation, an ID of UE, single-network slice selection assistance information (S-NSSAI) of the network slice, the list of services for the exemption, or location information that needs to be exceptionally processed, and wherein the MBR exemption information includes information for changing the MBR to a large value corresponding to the exemption of the bitrate limitation.

18. The AMF of claim 15, wherein the at least one processor is further configured to determine the MBR exemption information based on at least one of the information related to an exemption of the bitrate limitation or logical configuration.

* * * * *